(12) United States Patent
Fukuda et al.

(10) Patent No.: US 9,157,350 B2
(45) Date of Patent: Oct. 13, 2015

(54) ENGINE SYSTEM

(71) Applicant: Yanmar Co., Ltd., Osaka-shi, Osaka (JP)

(72) Inventors: Kenichi Fukuda, Osaka (JP); Hiroki Nariyasu, Osaka (JP); Hirotoshi Kihara, Osaka (JP); Shojiro Koga, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 14/032,845

(22) Filed: Sep. 20, 2013

(65) Prior Publication Data
US 2014/0083084 A1    Mar. 27, 2014

(30) Foreign Application Priority Data

Sep. 21, 2012   (JP) ................ 2012-208774

(51) Int. Cl.
| | |
|---|---|
| *F01N 3/00* | (2006.01) |
| *F01N 5/02* | (2006.01) |
| *F02D 41/04* | (2006.01) |
| *F02D 41/02* | (2006.01) |
| *F02D 41/06* | (2006.01) |
| *F02N 11/08* | (2006.01) |
| *F02D 41/14* | (2006.01) |
| *F02D 41/00* | (2006.01) |
| *F02M 21/02* | (2006.01) |

(52) U.S. Cl.
CPC  *F01N 3/005* (2013.01); *F01N 5/02* (2013.01); *F02D 41/024* (2013.01); *F02D 41/042* (2013.01); *F02D 41/064* (2013.01); *F02N 11/0829* (2013.01); *F02D 41/0027* (2013.01); *F02D 41/0255* (2013.01); *F02D 2041/1472* (2013.01); *F02M 21/02* (2013.01); *Y02T 10/16* (2013.01); *Y02T 10/26* (2013.01); *Y02T 10/48* (2013.01)

(58) Field of Classification Search
USPC ............... 60/284, 286, 298, 300, 309, 320
See application file for complete search history.

(56) References Cited

U.S. PATENT DOCUMENTS

| | | | | |
|---|---|---|---|---|
| 6,804,949 | B2 * | 10/2004 | Andrews et al. | 60/272 |
| 6,912,840 | B2 * | 7/2005 | Posselt et al. | 60/274 |
| 7,805,928 | B2 * | 10/2010 | Shouda et al. | 60/285 |
| 8,464,524 | B2 * | 6/2013 | Bidner et al. | 60/309 |
| 8,661,796 | B2 * | 3/2014 | Yoshioka et al. | 60/300 |

FOREIGN PATENT DOCUMENTS

JP         2010-216399 A         9/2010

* cited by examiner

*Primary Examiner* — Binh Q Tran
(74) *Attorney, Agent, or Firm* — Crowell & Moring LLP

(57) ABSTRACT

To provide a configuration that can discharge condensed water remaining in an exhaust gas passage in an engine in which a catalyst is placed in the exhaust gas passage. An engine system (100) is an engine system having an engine (10) in which a catalyst (6) is placed in an exhaust gas passage (31). The engine system (100) has a determination device (81a) for determining whether or not the catalyst (6) is immersed in the condensed water condensed from exhaust gas in a cold state and remaining in the exhaust gas passage (31) when the engine (10) is started, and an operation continuing device (81b) that allows operation of the engine (10) to continue when it is determined that the catalyst (6) is immersed in the condensed water so that a discharge operation time Te exceeds a required time.

2 Claims, 2 Drawing Sheets

ENGINE SYSTEM

BACKGROUND OF THE INVENTION

1. Field of the Invention

The present invention relates to an engine system having an engine, in which a catalyst is placed in an exhaust gas passage.

2. Description of Related Art

Conventionally, there is known an engine technology in which a catalyst is placed in an exhaust gas passage in order to remove condensed water generated by condensation of moisture in exhaust gas. JP 2010-216399 A discloses a configuration of inhibiting generation of the condensed water in an exhaust gas passage by controlling ignition timing and an air-fuel ratio on the basis of a temperature of the exhaust gas.

If the engine is started in a cold state, the exhaust gas condenses when the exhaust gas passes the exhaust gas passage, and the condensed water is generated. If operation of the engine is continued, since the temperature of the exhaust gas passage is also increased, the condensed water once condensed is also evaporated and removed. However, if the operation of the engine is stopped for a short time, the condensed water remains in the exhaust gas passage. If such a short time operation is repeated, the amount of the remaining condensed water cannot be ignored, and there is a possibility that the catalyst in the exhaust gas passage is immersed.

JP 2010-216399 A discloses a configuration of inhibiting the condensed water generated during the operation of the engine. However, JP 2010-216399 A does not disclose a configuration of discharging the condensed water remaining in the exhaust gas passage. Although the condensed water can be discharged by providing a drainage passage in the exhaust gas passage, it is sometimes difficult to install the drainage passage in terms of layout or maintenance of the engine.

It is an object of the present invention to provide a configuration that can discharge the condensed water remaining in an exhaust gas passage of an engine in which a catalyst is placed in an exhaust gas passage.

SUMMARY OF THE INVENTION

An engine system of the present invention has an engine in which a catalyst is placed in an exhaust gas passage, the engine system comprising:

a determination device for determining whether or not the catalyst is immersed in condensed water condensed from exhaust gas in a cold state and remaining in the exhaust gas passage when the engine is started; and an operation continuing device for allowing operation of the engine to continue so that a discharge operation time exceeds a required time when it is determined that the catalyst is immersed in the condensed water, wherein the discharge operation time is an operation time of the engine, and the discharge operation time is a single continuous operation time or a total of a plurality of consecutive operation times exclusive of a stop time in a hot state, the hot state is a state in which a temperature of the exhaust gas passage is increased, so that generation of the condensed water is inhibited, and the required time is set as the discharge operation time required to completely evaporate the condensed water remaining in the exhaust gas passage.

In the above engine system, the determination device is configured to determine that the catalyst is immersed in the condensed water if the number of consecutive times of cold start-stop exceeds a predetermined number, and the cold start-stop shows that the engine starts in the cold state and stops within the required time.

The engine system according to the present invention can discharge the condensed water remaining in the exhaust gas passage in the engine in which the catalyst is placed in the exhaust gas passage.

DETAILED DESCRIPTION OF THE PREFERRED EMBODIMENTS

Figure 1:
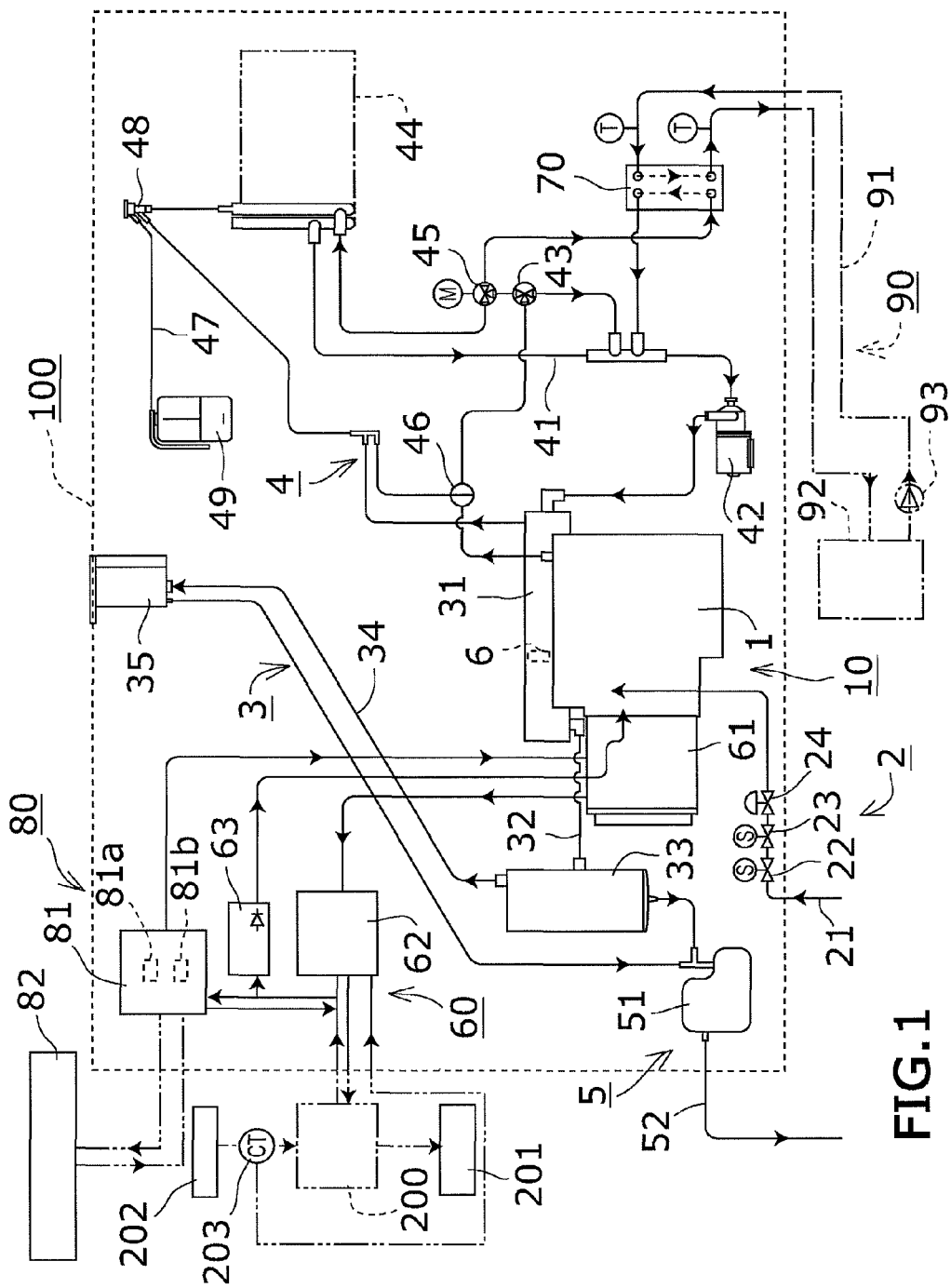
FIG. 1 is a block diagram of a cogeneration system.

FIG. 1 is a block diagram of a cogeneration system 100. The cogeneration system 100 is one of engine systems utilizing an engine 10. The system 100 has the engine 10, an electric output mechanism 60, a heat recovery device (heat output mechanism) 70, and a control mechanism 80. In the present embodiment, the engine 10 is a gas engine. The electric output mechanism 60 is a mechanism of taking out power outputted from the engine 10 as an electric output. The heat recovery device 70 is a heat output mechanism of taking out exhaust heat outputted from the engine 10 as a heat output. In the present embodiment, the heat recovery device 70 is a heat exchanger between cooling water and hot water, and recovers the exhaust heat of the engine 10 which is discharged through the cooling water. The control mechanism 80 controls the engine 10 and the electric output mechanism 60.

The engine 10 has an engine body 1, a fuel supply mechanism 2, an exhaust gas discharge mechanism 3, a cooling water circuit 4, and a condensed water drainage mechanism 5.

The fuel supply mechanism 2 has a fuel passage 21 reaching the engine body 1, and opening/closing valves 22, 23, 24 for opening/closing the fuel passage 21. The fuel supply mechanism 2 supplies a fuel gas to the engine body 1.

The exhaust gas discharge mechanism 3 is an exhaust gas passage that reaches outside air from the engine body 1. The exhaust gas discharge mechanism 3 has an exhaust gas heat exchanger 31, a pipe line 32, a silencer 33, a pipe line 34, and a mist separator 35. The exhaust gas heat exchanger 31 performs heat exchange between exhaust gas and the cooling water. The exhaust gas is discharged to outside air after going through the exhaust gas heat exchanger 31, the pipe line 32, the silencer 33, the pipe line 34, and the mist separator 35 in sequence.

A catalyst 6 for treating the exhaust gas is placed in the exhaust gas heat exchanger 31. The catalyst 6 is a three-way catalyst, for example. The catalyst 6 may be placed upstream or downstream of the exhaust gas heat exchanger 31.

The cooling water circuit 4 has a cooling water passage 41, a pump 42, a thermostat valve 43, a radiator 44, a three-way valve 45, a filter 46, a water supply line 47, a water-refilling port 48, and a cooling water tank 49. The heat recovery device 70 is also placed on the cooling water passage 41. The cooling water is allowed to flow along the cooling water passage 41 by driving the pump 42. After coming out from a water jacket of the engine 10, the cooling water reaches the thermostat valve 43. If the cooling water has a predetermined temperature (e.g., 60° C.) or higher, it flows through the three-way valve 45, and if it has a temperature lower than the predetermined temperature, it returns to the water jacket. The three-way valve 45 controls a flow rate of the cooling water that flows through the radiator 44 and the heat recovery device 70. As described above, the exhaust heat of the engine 10 is taken out from the heat recovery circuit 70 through the cooling water. The water supply line 47 is connected to the cooling water passage 41 at the water-refilling port 48, and the cooling water tank 49 is placed on the water supply line 47. As necessary, cooling water is replenished from the water-refilling port 48 to the cooling water passage 41 and/or the cooling water tank 49.

The condensed water drainage mechanism 5 has a drain filter 51 connected to the silencer 33 and the mist separator 35, and a drainage passage 52. The condensed water drainage mechanism 5 recovers and discharges the condensed water generated in the exhaust gas discharge mechanism 3 downstream of the silencer 33.

The electric output mechanism 60 has a power generator 61, an inverter 62, and a transformer 63. The power generator 61 is driven by power of the engine, and outputs electric power. This generated power is converted by the inverter 62, and supplied to an electric power load 201 via a distribution board 200 outside the system 100. A commercial power supply 202 is connected to the distribution board 200 via a current transformer 203, so that system interconnection of commercial power to the generated power is enabled.

The control mechanism 80 has an automatic control panel 81 and a remote controller (system controller) 82. The remote controller 82 controls the automatic control panel 81, and the automatic control panel 81 controls the engine 10 and the electric output mechanism 60.

A hot water circuit 90 is connected to the system 1. The hot water circuit 90 has a hot water passage 91, a tank 92, and a pump 93. The heat recovery device 70 is also placed on the hot water passage 91. Hot water is allowed to flow along the hot water passage 91 by driving the pump 93, and the exhaust heat of the engine 10 is taken out by the heat recovery device 70 so as to be supplied to the tank 92.

Figure 2:
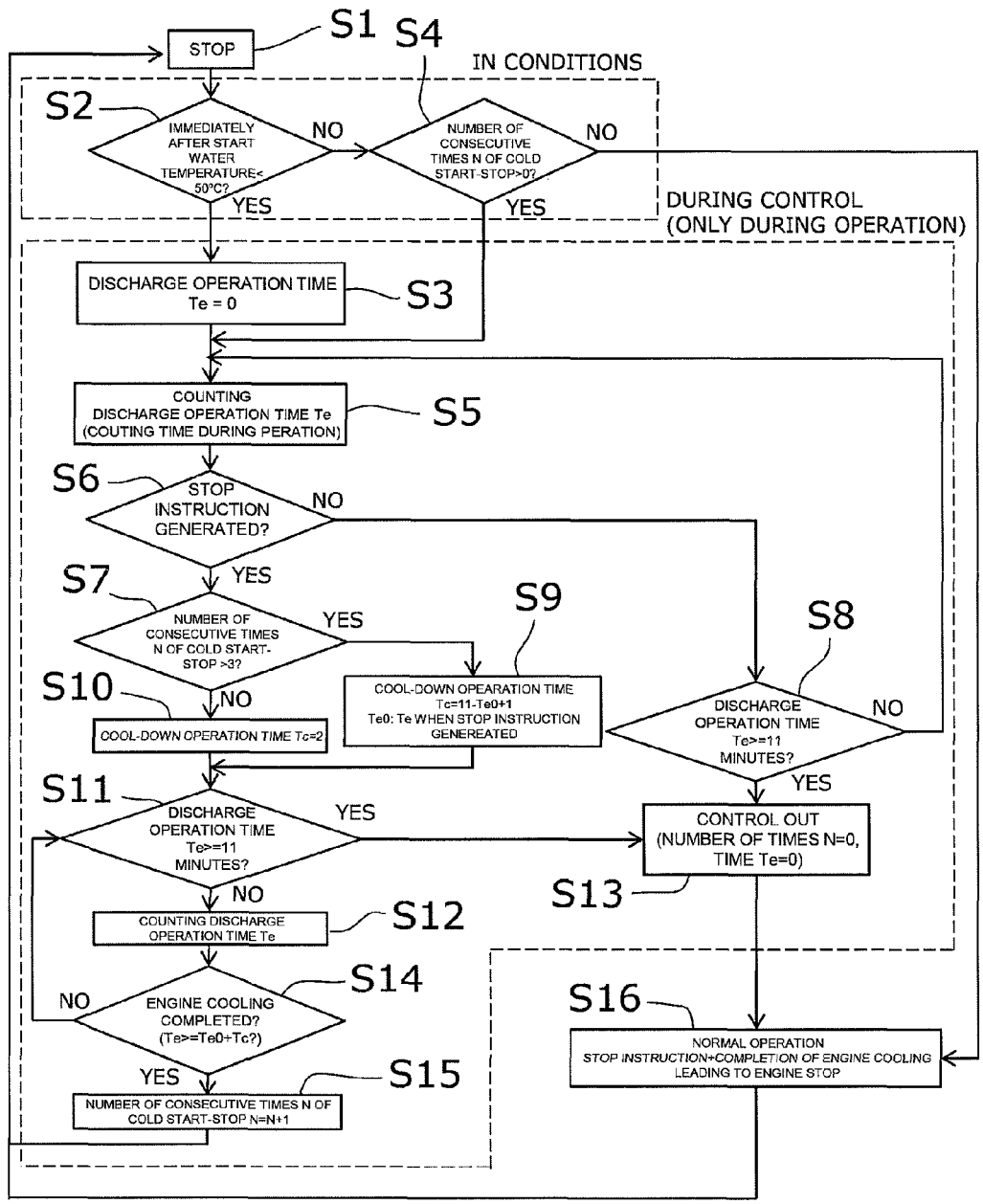
FIG. 2 is a flow diagram of condensed water discharge control.

With reference to FIG. 2, condensed water discharge control will be described. When the engine 10 is started in a cold state, moisture in exhaust gas is condensed, so that the condensed water is generated, and falls in the exhaust gas passage. After starting the engine 10 in the cold state (cold start), if operation of the engine 10 is continued, since the temperature of the exhaust gas passage approaches the temperature of the exhaust gas, generation of the condensed water is inhibited, and the condensed water which has already been generated is also evaporated. On the other hand, if the operation of the engine 10 is ended in a short time, since the engine 10 is still in the cold state, the condensed water does not evaporate. If such cold start-stop is performed, namely the operation for a short time is performed after the cold start and a cold stop (stop in the cold state) is performed, the condensed water remains in the exhaust gas passage. If the cold start-stop is continuously repeated, the amount of the remaining condensed water increases. As described above, although the condensed water generated downstream of the silencer 33 is removed by the condensed water drainage mechanism 5, the condensed water generated in the exhaust gas heat exchanger 31 is not removed. In particular, the catalyst 6 is placed in the exhaust gas heat exchanger 31, and if the amount of the condensed water is increased, there is a possibility that the catalyst 6 is immersed in the condensed water. The condensed water discharge control (hereinafter referred to as discharge control) is a control for controlling the operation of the engine 10 so that the remaining condensed water is removed on the basis of whether or not there is a possibility that the catalyst 6 is immersed in the condensed water.

FIG. 2 is a flow diagram of condensed water discharge control. In FIG. 2, Steps S2, S4 are processing groups related to conditions (IN conditions) for starting the condensed water discharge control, and Steps S3, S5-S15 are processing groups during implementation of the condensed water discharge control.

On the basis of an instruction to start or stop the engine 10, the instruction being transmitted from the remote controller 82, the automatic control panel 81 performs a flow of FIG. 2 including the condensed water discharge control. In FIG. 1, the automatic control panel has a determination device 81a and an operation continuing device 81b for performing the condensed water discharge control. Step S1 shows a stopped state of the engine 10.

When the start instruction is issued, the step S2 is performed. In the step S2, whether or not the temperature of the cooling water is lower than a predetermined temperature (50° C. in the present embodiment) is determined. If the temperature of the cooling water is lower than the predetermined temperature (50° C.), it is determined that the start of the engine 10 is the cold start, and the step S3 is performed. If the temperature of the cooling water is the predetermined temperature (50° C.) or higher, it is determined that the start of the engine 10 is a hot start, and the step S4 is performed. The hot start shows the start of the engine 10 in a hot state, and the hot state shows a state in which the temperature of the exhaust gas passage is increased, so that generation of the condensed water is inhibited. As a reference for determining whether or not there is the cold start, the temperature of an engine oil may be used in place of the temperature of the cooling water.

In the step S3, a condensed water discharge operation time Te is reset to 0.

The condensed water discharge operation time (hereinafter referred to as discharge operation time) Te is an operation time of the engine 10, and is useful for evaporating the condensed water that once remains. In order to evaporate the remaining condensed water, it is required that heating the exhaust gas passage be continued for a required time or more. The required time is set as the discharge operation time Te required to completely evaporate the condensed water remaining in the exhaust gas passage. In the present embodiment, the required time is 11 minutes. As long as the operation of the engine 10 is continued, the exhaust gas passage is heated through the exhaust gas. Therefore, this operation time corresponds to the discharge operation time Te. On the other hand, if the operation of the engine is stopped, the exhaust gas passage is cooled. Therefore, if the operation time before stop is less than the required time, the operation time does not function as the discharge operation time Te. However, even if the operation of the engine is interrupted, if the next start is immediately performed, namely the engine 10 is started in a state in which the hot state is maintained, the previous operation time can also be included in the discharge operation time Te. Therefore, the discharge operation time Te is a single continuous operation time or a total of a plurality of consecutive operation times exclusive of the stop time in the hot state.

The step S5 is performed next to the step S3 or S4. In the step S5, the discharge operation time Te is counted. As long as no stop instruction is generated in the step S6, and the discharge operation time Te does not exceed the required time (11 minutes), counting the discharge operation time Te is continued. The steps S6, S8 will be described in detail below.

The step S6 is performed next to the step S5. In the step S6, whether or not the stop instruction is generated is determined. If the stop instruction is generated, the step S7 is performed. If no stop instruction is generated, the step S8 is performed. If the stop instruction is generated, a control for stopping the engine 10 is started. That is, it does not mean that the engine 10 is stopped immediately after the stop instruction is generated. First, cool-down operation in a state close to no load is performed, and then the engine 10 is stopped.

In the step S7, whether or not the number of consecutive times N of the cold start-stop is larger than a predetermined number is determined.

The cold start-stop shows that the engine 10 starts in the cold state and stops within the required time. The number of consecutive times of the cold start-stop shows the number of times the cold start-stop was repeated without being interrupted until this start. If the previous start-stop is not the cold start-stop, the number of consecutive times N of the cold start-stop is 0. The number of times N is reset to 0 in the subsequent the step S13.

If the number of times N is larger than the predetermined number, the step S9 is performed, and if the number of times N is a predetermined number or smaller, the step S10 is performed. In the present embodiment, the predetermined number is 3.

The predetermined number is set on the basis of an allowable limit value of the amount of the condensed water. As described above, the amount of the remaining condensed water increases as the cold start-stop is repeated. As a result, the catalyst 6 is sometimes immersed in the condensed water. By experimentally measuring the amount of the remaining condensed water, the predetermined number when the amount of the remaining condensed water exceeds the allowable limit value can be specified.

If processing goes on to the step S9, the amount of the condensed water exceeds the allowable limit value. In this case, it is necessary to discharge the condensed water. In the step S9, the processing is performed so that this operation exceeds the required time for the discharge operation time Te is exceeded by this operation.

In the step S9, a cool-down operation time Tc is set on the basis of a discharge operation time upon generation of the stop instruction (hereinafter referred to as specific operation time) Te0. Here, if the processing goes on to the step S7 from the step S6, counting the discharge operation time Te is interrupted and therefore, the discharge operation time in the step S9 is equal to the specific operation time Te0. The cool-down operation time Tc indicates a time in which the cool-down operation of the engine 10 is performed. The cool-down operation is also one form of operation of the engine 10, and since the exhaust gas passage is heated during this operation, the cool-down operation time Tc is also included in the discharge operation time Te. As described above, when the cool-down operation is ended, the engine 10 is stopped. Therefore, the cool-down operation time Tc is set so that the discharge operation time Te including the cool-down operation exceeds the required time. In the present embodiment, the cool-down operation time Tc is found by the following formula:

$$Tc = 11 - Te0 + 1$$

Tc: cool-down operation time (min.)
11: required time (min.)
Te0: specific operation time (min.)
1: additional time (min.)

On the other hand, if the processing goes on to the step S10, since the amount of the condensed water does not exceed the allowable limit value, discharge of the condensed water is not performed.

In the step S10, the cool-down operation time Tc is set to a predetermined usual cool-down operation time. In the present embodiment, the usual cool-down operation time is 2 minutes.

The step S11 is performed next to the step S9 or S10. In the step S11, whether or not the discharge operation time Te is the required time (11 minutes) or more is determined. If the discharge operation time Te is less than the required time (11 minutes), the step S12 is performed. If the discharge operation time Te is the required time (11 minutes) or more, the step S13 is performed.

In the step S12, the discharge operation time Te interrupted in the step S7 is counted again.

The step S14 is performed next to the step S12. In the step S14, whether or not the cool-down operation is completed is determined. If the cool-down operation time Tc elapses, the cool-down operation is completed. Therefore, specifically, in the step S14, whether or not the discharge operation time Te is longer than a total operation time of the specific operation time Te0 and the cool-down operation time Tc is determined. If the cool-down operation is completed, the step S15 is performed. If the cool-down operation is not completed, the step S11 is performed again.

In the step S15, the number of consecutive times N of the cold start-stop is increased by only 1. If the step S15 is performed, after started in the cold state, the engine 10 is stopped without exceeding the required time for the discharge operation time Te. This case corresponds to the cold start-stop.

Next, the step S8 will be described. As described above, the step S8 is performed if the stop instruction is not generated in the step S6. In the step S8, whether or not the discharge operation time Te is the required time (11 minutes) or more is determined. If the discharge operation time Te is the required time (11 minutes) or more, the step S13 is performed. If the discharge operation time is less than the required time (11 minutes), the step S5 is performed again.

If the step S13 is performed, the discharge operation time Te is the required time (11 minutes) or more. In this case, it is not necessary to increase the operation time for discharging the condensed water. That is, in the step S13, the condensed water discharge control is ended.

In the step S13, the number of consecutive times N of the cold start-stop is reset to 0, the discharge operation time Te is reset to 0.

Step S16 is performed next to the step S13. In the step S16, normal operation control is performed. In the normal operation control, the operation is continued until the stop instruction is generated. If the stop instruction is generated, the cool-down operation is started, leading to stop of the engine 10. Since the stopped state of the engine 10 shows the step S1, the processing returns to the step S1 next to the step S16.

Next, the step S4 will be described. As described above, the step S4 is performed if it is determined that the start of the engine 10 is the hot start. In the step S4, whether or not the number of consecutive times N of the cold start-stop is more than 0 is determined. That is, although this start is the hot start, whether or not the previous start-stop is the cold start-stop is determined. If the number of consecutive times N is more than 0, the step S5 is performed. If the number of consecutive times N is 0, the step S16 is performed.

If the processing goes on to the step S5 from the step S4, the step S3 of resetting the discharge operation time Te to 0 is ignored. Therefore, the discharge operation time Te obtained in the previous start-stop is utilized also during this start. In this case, since the engine is started in a state in which the hot state is maintained as described above, this corresponds to the case where the previous operation time is included in the discharge operation time Te. The subsequent processing is similar to the case where the step S3 is performed except that the discharge operation time Te is discontinuous.

The engine system of the present embodiment has the following effects by the following configuration described above.

(1) The engine system has the determination device 81a and the operation continuing device 81b. When the engine 10 is started, the determination device 81 determines whether or not the catalyst 6 is immersed in the condensed water condensed from the exhaust gas in the cold state and remaining in the exhaust gas passage. The determination by the determination device 81a corresponds to the processing of the steps S2-S8, S11-S12, S14-S15 in FIG. 2. If it is determined that the catalyst 6 is immersed in the condensed water, the operation continuing device 81b allows the operation of the engine 10 to continue so that the discharge operation time Te exceeds the required time. The processing by the operation continuing device 81b corresponds to the processing of the step S9 in FIG. 2.

Therefore, the engine system according to the present embodiment can discharge the condensed water remaining in the exhaust gas passage.

(2) The judgment device 81a is configured to determine that the catalyst 6 is immersed in the condensed water if the number of consecutive times N of the cold start-stop exceeds the predetermined number. This determination corresponds to the processing of S7 in FIG. 2.

Therefore, the engine system according to the present embodiment can discharge can detect the amount of the condensed water remaining in the exhaust gas passage without directly detecting the amount.

What is claimed is:

1. An engine system having an engine in which a catalyst is placed in an exhaust gas passage, the engine system comprising:
    a determination means for determining whether or not the catalyst is immersed in condensed water condensed from exhaust gas in a cold state and remaining in the exhaust gas passage when the engine is started; and
    an operation continuing means for allowing operation of the engine to continue so that a discharge operation time exceeds a required time when it is determined that the catalyst is immersed in the condensed water, wherein
    the discharge operation time is an operation time of the engine, and the discharge operation time is a total of a plurality of consecutive operation times exclusive of a stop time in a hot state,
    the hot state is a state in which a temperature of the exhaust gas passage is increased, so that generation of the condensed water is inhibited, and
    the required time is set as the discharge operation time required to completely evaporate the condensed water remaining in the exhaust gas passage.

2. An engine system having an engine in which a catalyst is placed in an exhaust gas passage, the engine system comprising:
    a determination means for determining whether or not the catalyst is immersed in condensed water condensed from exhaust gas in a cold state and remaining in the exhaust gas passage when the engine is started; and
    an operation continuing means for allowing operation of the engine to continue so that a discharge operation time exceeds a required time when it is determined that the catalyst is immersed in the condensed water, wherein
    the discharge operation time is an operation time of the engine, and the discharge operation time is a single continuous operation time or a total of a plurality of consecutive operation time exclusive of a stop time in a hot state,
    the hot state is a state in which a temperature of the exhaust gas passage is increased, so that generation of the condensed water is inhibited,
    the required time is set as the discharge operation time required to completely evaporate the condensed water remaining in the exhaust gas passage,
    the determination means is configured to determine that the catalyst is immersed in the condensed water if the number of consecutive times of cold start-stop exceeds a predetermined number, and
    the cold start-stop shows that the engine starts in the cold state and stops within the required time.

* * * * *